Nov. 7, 1950     J. W. ANDERSON     2,528,678
WINDSHIELD CLEANER
Filed Nov. 1, 1945     2 Sheets-Sheet 2
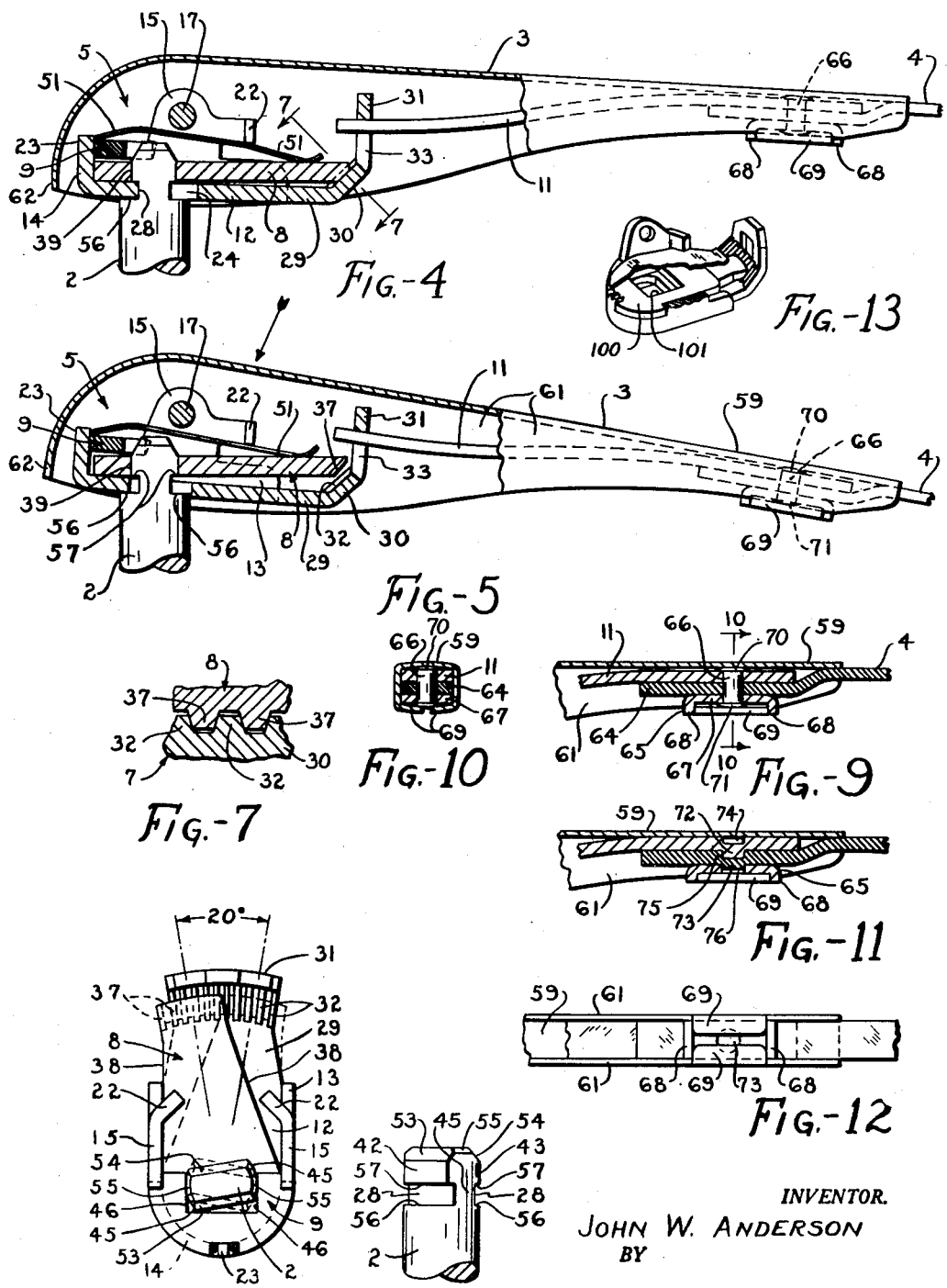
INVENTOR.
JOHN W. ANDERSON
BY
Charles S. Penfold ATTORNEY Patented Nov. 7, 1950

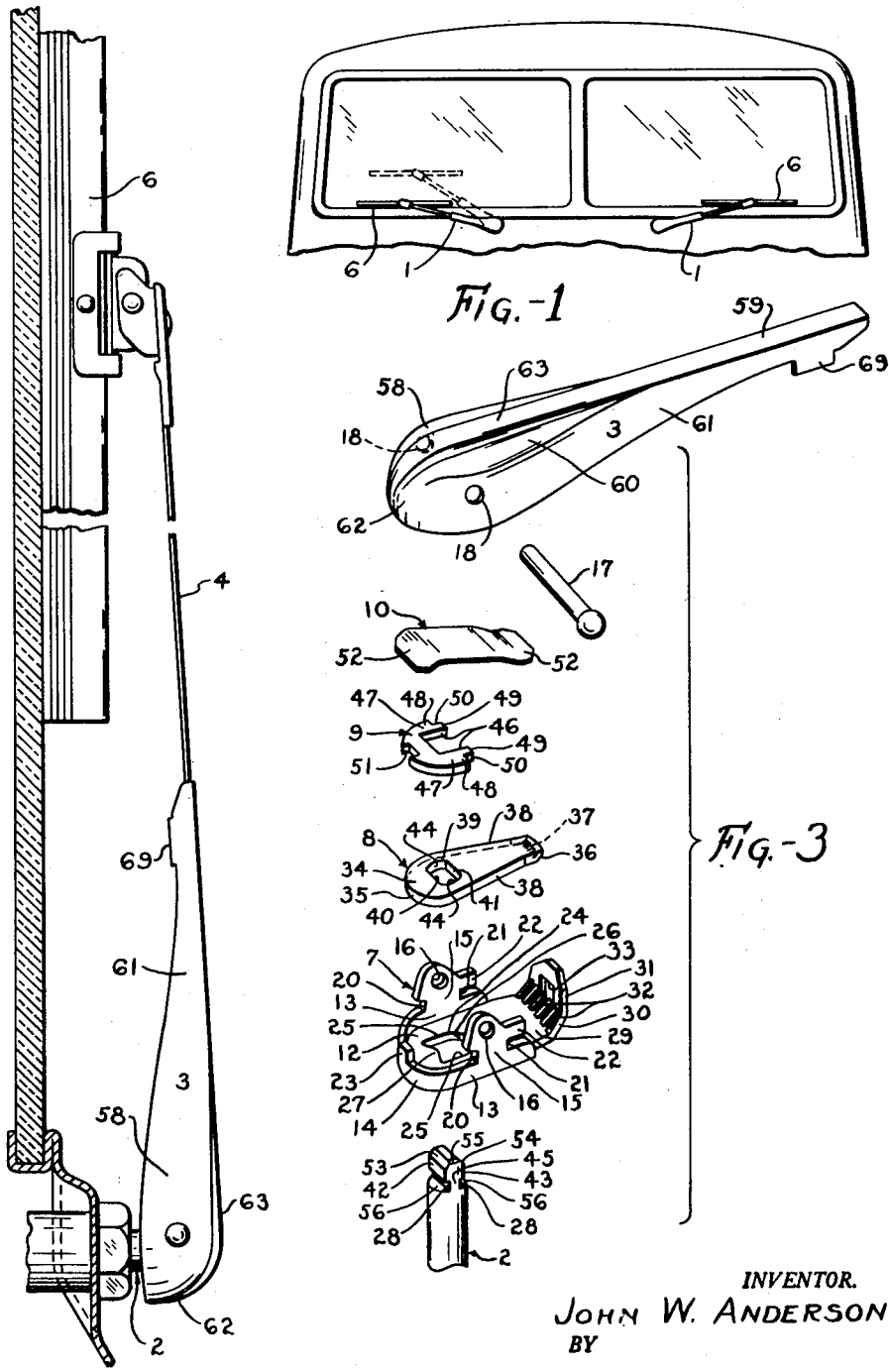

2,528,678

UNITED STATES PATENT OFFICE 2,528,678

WINDSHIELD CLEANER

John W. Anderson, Gary, Ind., assignor to Productive Inventions, Inc., a corporation of Indiana Application November 1, 1945, Serial No. 625,972

18 Claims. (Cl. 287—53)

This invention is related to windshield cleaners and more particularly is directed to improved means for coupling or connecting the means supporting the cleaner or wiper to driving means, such as an oscillating or rotatable shaft.

In modern automotive construction and design the shaft of the motor or other driving mechanism for the cleaner preferably projects or extends in an appropriate direction with respect to the windshield and the wiper arm carrying the wiper or cleaner is preferably connected or assembled to the free extremity of the shaft. In mass production it is not always possible to predetermine or locate the shaft in the exact position, particularly in its proper rotative position according to specifications. This inability to predetermine the proper rotative position of the shaft is a distinct disadvantage due to the fact that when the wiper arm is connected thereto, it will not assume the position intended or desired, and as a consequence the wiper or cleaning means will not wipe or clean the area of the windshield required and the wiper will not return to its proper inoperative generally parallel position with respect to a part of the windshield frame or body of the vehicle.

Automobile manufacturers have found objectionable windshield wiper arm models for original equipment which require for installation the use of tools such as wrenches or screw drivers. The employment of such tools has been found to prolong the time and increase the labor cost involved in making such installation on the assembly line at the factory. The careless use of such tools also causes accidental abrading contact of the tools with the external finish of the automobile with the result that the particular vehicle so defaced must be set aside for refinishing, which causes delays and added costs.

Automobile manufacturers have further found objectionable certain types of arms which, while requiring no tools for installation, must be removed from the shaft and reset when the prior guess at what would be the proper installation to provide the desired position of the wiper blade with relation to the windshield frame, has been incorrect. Often this resetting operation is omitted, with the result that the vehicle reaches the user with the area of contact of the wiper blade in an awkward position with relation to the windshield frame and the line of vision of the driver. Forced to deal with the human element in such installation the automobile manufacturer finds desirable a windshield wiper arm which embodies installation characteristics avoiding the difficulties above recited. The subject invention, it will be noted, requires but two motions of one hand of the employee making the installation and thus reduces the time required for the installation and increases the chance that the wiped area will be properly positioned with relation to the windshield. The installation of th subject arm, in fact, may be made as readily by a one-armed war veteran as otherwise. It thus permits the employment of disabled veterans as effectively as any other person.

The first motion is the simple motion of pressing the arm into position to snap on, or lock on, the shaft. The second motion is a simple motion of adjusting the arm radially to a predetermined position.

Since no tools are used and since there are no separate parts such as nuts or screws employed, any of which when inadvertently dropped mar the surface finish of the automobile, there is no loss of time and no added cost for refinishing. It is also obvious that it is never necessary to first remove the arm and reset it, which fact reduces the time required for installation of the subject invention.

The advantages above described and which accrue in original equipment installation are likewise advantages accruing to the service operator who replaces the original equipment arm, perhaps on a busy gasoline service station drive, where most such replacements are made, and where time saved in such replacement operations is important.

Moreover, it will be noted that the absence of projections incidental to the employment of fastening means such as nuts and screws and exposed hinges makes it easier to clean the surface of the subject arm after it has become discolored from use. The objectionable features of arms currently used for original equipment by automobile manufacturers have prevailed throughout the entire industry for many years. Engineers for automobile manufacturers and other engineers familiar with the industry have endeavored over a very long period to devise inventions by which those objectionable features could be completely eliminated in a single model of arm. Not only the inventor herein but inventive engineers and other employees associated with the inventor have addressed themselves to these problems over a long period of time and have developed, made, and tested many different models of arms and couplings in an effort to achieve the results now finally obtained in the subject invention.

Accordingly, one important object of the invention is to provide improved coupling means whereby the arm may be easily and quickly connected or disconnected with respect to the shaft and while connected may be adjusted to the desired rotative or pivotal position with respect to the shaft to overcome or offset the disadvantages alluded to above. More specifically, it might be stated without limitation, that the invention is directed to a construction embodying means connectable to shaft means for supporting windshield cleaner arm means, the connectable means including a part adapted to engage the shaft means in a manner for movement therewith and a member movably mounted with respect to the part, the member being provided with cooperating means and means to which an element of the arm means may be connected, and the said part being provided with means engageable with the cooperating means in a manner whereby the relative rotative position of the member with respect to the part may be selectively determined as desired.

Another object is to provide coupling means which may be employed in conjunction with means other than a wiper arm for connecting the means to a shaft.

A still further object is to provide an arrangement in which the arm means and coupling means are operatively connected together and influenced by flexible or resilient means in a manner whereby to obtain the desired linkage leverage and motion between the related parts and to urge the cleaner or wiper carried by the arm against the windshield.

Another object is to provide an arm structure that cannot be disconnected from the shaft except by first applying sufficient pressure to the arm in a predetermined direction with respect to the shaft.

A further object is to provide improved means for connecting the flexible means and the inner and outer sections or lengths of the arm means together whereby to substantially secure the means in operative relationship.

An important object is to provide unique methods whereby the various parts of the wiper arm are assembled together and adjusted with respect to the shaft.

Another object is to provide a construction consisting of a minimum number of parts, which may be economically manufactured and assembled on a production basis, and when assembled are positive and efficient in action and result.

Other objects and advantages of the invention will also become apparent after considering the description hereafter set forth in conjunction with the drawing annexed hereto.

In the drawing wherein the preferred structures to which the invention is susceptible are illustrated:

Figure 1 is a front plan view in elevation depicting the application of the invention with respect to a windshield;

Figure 2 is a side view in elevation of cleaner or wiper means showing the arm attached to a shaft and the wiper normally engaging a windshield, with various parts in section;

Figure 3 is an exploded view, clearly illustrating the relation of certain elements or parts of the arm structure, including the character of the driving means or shaft;

Figure 4 is a side view in elevation of the arm assembly attached to a shaft, with portions in section and portions broken away to better illustrate certain features of the invention;

Figure 5 is a side view similar to Figure 4, illustrating the position certain elements may assume in the act of adjusting the arm means with respect to the shaft;

Figure 6 is a top view depicting certain parts of the means employed for connecting the arm to the shaft, and mode of adjustment;

Figure 7 is a partial transverse enlarged sectional view taken substantially on line 7—7 of Figure 4 illustrating the preferred form of means which may be employed to advantage in positioning and locking the arm in the desired rotative position;

Figure 8 is an enlarged side view of the driving or shaft means;

Figure 9 is a partial view in section illustrating the means by which the section or parts of the arm and the flexible or resilient means for urging the arm toward the windshield are assembled together;

Figure 10 is a transverse section taken substantially on line 10—10 of Figure 9;

Figure 11 is a section somewhat similar to Figure 9 illustrating a modification to which the invention is susceptible;

Figure 12 is a bottom view of the assembly illustrated in Figure 11; and

Figure 13 is a perspective view showing a modified form of collar or stabilizing means which may be employed in conjunction with the coupling means.

Considering the characteristics of the invention more in detail, particularly with reference to Figures 1 and 2 of the drawing, there is illustrated a pair of corresponding cleaner or wiper means 1 suitably disposed for cleaning the panes of a vehicle windshield. Insofar as the present invention is concerned it is immaterial whether the driving means or shaft 2 to which the wiper means or arm 1 is connected is located adjacent the bottom of the windshield frame as shown, at the top, between the panes, or adjacent either end of the windshield proper.

The wiper arm, among other things, which will be subsequently described, preferably includes an inner section or extremity 3, in the form of a housing or shroud, and an outer extremity or section 4, in the form of a flexible flat metal strip. The free end of the outer section 4 carries a wiper 6 of any desirable conventional character as shown in Figures 1 and 2.

The connection or coupling means, generally designated 5, among other things, comprises a carriage member 7, a locking element or pawl 8, a thrust collar 9, and resilient means 10, which are preferably associated together in a unique manner to more or less constitute a separate and independently operable sub-assembly or unit, which is adapted for detachable snap connection with respect to the driving means or shaft 2. Flexible means, preferably in the form of an elongated leaf spring 11 is operatively related to the arm through said separate sub-assembly or unit for urging the arm and associated wiper toward and against the windshield.

The carriage member 7 is preferably made generally oblong in shape and includes a planar base or bottom wall 12, and corresponding outwardly extending parallel side walls 13 joined by a circular end wall 14. The side walls 13 are provided with corresponding spaced apart standards 15 disposed in the same planes as the side walls. The outer end of each standard is provided with a hole 16 through which a headed pintle or pivot pin 17 projects, the ends of the pin extending into apertures 18 provided therefor in the side walls of the housing 3 whereby to provide a pivotal connection between the arm and the coupling and secure the coupling unit substantially within the confines of the housing. The housing 3 and coupling means 5 are so constructed and arranged that each is adapted to more or less guide the other in movement and counteract thrust and vibration therebetween.

The marginal edges of each standard are preferably interrupted by a pair of oppositely disposed cutouts or notches 20 and 21, the latter resulting in the formation of bendable locking fingers 22 which assist in holding the pawl 8 and resilient means 10 in place, and the circular end wall 14 of the carriage is preferably provided with a lug 23 to assist in holding the thrust collar 9 and means 10 in position, all of which will be described more in detail subsequently.

That portion of the base wall 12 between and bridging the side walls 13 is provided with a centrally disposed oblong opening 24 adapted to receive the end of the shaft 2. This opening is defined by a pair of substantially parallel marginal side edges 25, a circular marginal edge 26 at one end, and a re-entrant or inturned tapered projection 27, adjacent the other end for reception in either of the notches or seats 28 provided in the drive shaft 2 depending on the rotative position of the shaft.

The arrangement is such that the opening 24 axially receives the shaft end in substantially any rotative position within a predetermined range whereby the projection 27 cooperates with one of the notches 28 for holding the carriage and associated structure constituting the coupling means against outward axial displacement with respect to the shaft. More specifically, the projection 27 is so constructed and arranged that a recess is formed adjacent each side of the projection to provide clearances whereby to allow for the rotation of the carriage.

The base or bottom wall 12 of the carriage includes a prolongation projecting an appropriate distance beyond the terminations of the side walls 13, as indicated at 29. This prolongation is preferably provided with an continuation extending in the same general direction as the standards 15 and includes a pair of portions 30 and 31. The portions 30 and 31 are preferably arcuate in cross-section and may be disposed as desired but are preferably angled at 45° and 90° to the plane of the base portion 12, respectively. The inner inclined surface of the portion 30 is preferably provided with a plurality of radially extending teeth 32, preferably formed therein by a swaging operation. The portion or termination 31 is preferably provided with a generally square or rectangular shaped opening 33 which is adapted to slidably receive the inner extremity of the flexible means 11, as clearly illustrated in Figures 4 and 5.

The locking means or pawl member 8, above referred to, is generally planar in character and nests or fits substantially within the confines of the carriage 7 between the side walls 13, as clearly illustrated in Figures 4 through 6. The pawl is generally spatulate in shape and preferably constructed of steel or other hard desirable material due to the fact that it is subjected to considerable strain when the cleaner is operated. One extremity of the pawl is preferably circular in shape as indicated at 34 so that the round marginal edge 35 normally engages the inner circular surface of the circular end wall 14 of the carriage when the coupling is connected to the shaft, as illustrated in Figure 4. Its opposite and smaller extremity is preferably rounded to conform to the curvature of the portions 30 and 31 of the carriage and beveled as indicated at 36, the bevel being provided with a plurality of teeth 37 which are of a character to intermesh with the teeth 32 on the portion 30 of the carriage in a manner whereby the pawl member and carriage member may be selectively positioned and locked in any one of a plurality of rotative positions with respect to each other within a predetermined range or arc of movement. This invention contemplates the provision of means other than interlocking teeth. For example, roughened surfaces, or a plain frictional contact, may be provided where load conditions permit, or in fact any arrangement to obtain an infinite number of desired locking positions. Any kind of teeth may be employed, but those corresponding or similar to the Acme type have proven desirable. The tapering marginal edges 38 of the pawl are of a character whereby to engage the side walls 13 of the carriage for limiting or defining the range of movement of the pawl with respect to the carriage or the carriage with respect to the pawl and shaft. Any suitable range of movement between the carriage and pawl may be provided but tests have proven that a rotative range of approximately 20°, as illustrated in Figure 6, is sufficient to allow or permit the arm to be desirably connected and shifted with respect to the shaft to compensate for the various inaccurate preset rotative positions of the shaft in mass production, as pointed out above. The pawl member is provided with a generally oblong aperture 39 in general alignment with the opening 24 in the carriage and is adapted to receive the shaft 2. This aperture 39 is defined by corresponding parallel marginal edges 40 and 41 which are adapted to engage the corresponding parallel flat portions 42 and 43 of the shaft and round end margins 44 which are adapted to engage the circular portions 45 of the shaft. A close fit or connection between the shaft and pawl is thereby established in order to substantially prevent the pawl from moving transversely of the longitudinal axis of the shaft. The fit is as close as manufacturing tolerances will permit. During assembly the pawl may be seated in the carriage in any position within the prescribed range.

The thrust collar 9, above referred to, is generally U-shaped and straddles the shaft in a manner whereby the inner parallel edges 46 of the legs 47 more or less engage the circular portions 45 of the shaft to stabilize and balance the connection between the coupling and shaft, and at the same time assists in holding the pawl to the carriage. It is preferably connected to the carriage by tilting and inserting the same so that the portions 48 and 49, formed by notches 50 adjacent the extremities of the legs 47, will be received in the notches 20 and between the standards 15, of the carriage, respectively, whereupon the collar may be pressed against the edges of the side walls with the notch 51, interrupting the circular end of the collar, receiving the lug 23 on the carriage, the lug being distorted as illustrated in Figure 6. The collar is thus firmly secured to the carriage and since the portions 48 of the collar are caught in the notches 20 of the standards, the collar is substantially held against axial movement at the desired location when the coupling is being connected to the shaft. The recess defining the legs of the collar is disposed in general co-axial relation to the opening 24 and aperture 39 in the carriage and pawl and when the carriage is rotated for adjustment with respect to the pawl and shaft the marginal edges 46 may more or less slidably engage the circular portions of the shaft. The collar has proven to be an asset to the coupling means but in certain applications may be omitted without materially affecting the operation of the coupling.

In Figure 13 of the drawing, there is illustrated, a coupling which, except for a few changes in design and construction, substantially corresnds to the coupling unit 5. In Figure 13, notches such as 20 above referred to, are omitted and a collar 100 of a different character is employed. This collar is of a length so that its outer extremity is engaged by the outer end of the resilient means 10 and is caught under fingers corresponding to the fingers 22. The collar 9 above referred to is of such a character that its legs 47 may have a tendency to spread apart where load conditions are heavy. The provision of an opening such as 101 in the collar 100 substantially overcomes this condition. This improved modified coupling is particularly well-stabilized and well-balanced for the purpose of withstanding excessive loads or undue tortional and other strains placed, in some applications, upon the various parts comprising the coupling unit.

When the pawl and collar are properly positioned with respect to the carriage, the lug 23 and the fingers 22 may be distorted or turned inwardly whereby to hold the pawl in place as illustrated in Figures 4 through 6.

The resilient means or spring 10, above referred to, is preferably generally rectangular in shape and constructed from relatively thin sheet metal strip stock. The end extremities of the spring are preferably angled as indicated at 51, and the intermediate portion is generaly planer in character. The spring may be easily and quickly assembled and locked in place by merely inserting its entrance end between the standards and under the inturned fingers 22 to a predetermined position whereupon the opposite end will be caused to ride over and snap down behind the lug 23 to engage and hold the collar 9 in place. The spring 10 is thus backed against the fingers and placed under tension to cause its entrance end to press the pawl in a direction whereby the corresponding teeth 32 and 37 are normally held in interlocking relation before and after the coupling means is connected to the shaft, as substantially depicted in Figure 4. Attention is directed to the fact that the pawl is preferably of a length whereby when properly seated will assume a generally inclined position so that a good connection is established between the teeth 32 and 37. The spring is so constructed and arranged with respect to the carriage and pawl that it normally urges itself against the lug 22 thereby preventing the spring from moving in an opposite direction where it would interfere with the connection between the flexible means 11 and the carriage. The spring is also arched sufficiently so as not to engage the shaft.

It is to be noted that the shaft 2 is preferably provided with corresponding beveled faces 53 and 54 adjacent the flats 42 and 43, with facets 55 adjacent the circular portions 45 of the shaft whereby to assist in piloting or guiding the coupling onto the shaft, and with abutments or shoulders 56 and 57 formed by the notches or recess 28.

The application of a preferred form of coupling means to a preferred form of arm means or structure will now be described more in detail. The housing 3 which constitutes the inner section of the arm includes an enlarged extremity 58 within which the coupling means is pivotally mounted and a smaller channeled extremity 59, within which is secured the leaf spring 11 and the outer section 4 of the arm structure. The extremities of the housing are flared or merged into each other to present a design substantially simulating an elongated tear drop. The housing includes, among other things, a top wall 60, tapering side walls 61, and a circular end wall 62 more or less corresponding to the curvature of the end wall 14 of the carriage. The top wall is provided with a longitudinally extending rib 63 which constitutes a continuation of the channel 59 to present a streamlined effect or appearance. The end of the pivot 17 opposite the headed end is preferably upset or flanged after the coupling is mounted in the housing for locking the coupling in place.

The arm sections and leaf spring may be attached together as desired but are preferably secured as illustrated in Figures 9 and 10. The inner offset planar portion 64 of the arm section 4 is shown as being secured between the outer end of the leaf spring 11 and a holding member 65 by a rivet 66 which extends through holes provided therefor in the parts. The holding member preferably includes a flat base wall 67 and transverse end walls 68. The side walls 61 of the extremity 59 of the housing are provided with corresponding locking fingers 69. The arm section 4, spring 11, and holding member are substantially of the same width, and when thus secured together constitute a separate subassembly or unit. This unit is disposed in the channel extremity 59 with the inner end of the spring 11 extending into the opening 33 in the outturned portion of the carriage whereupon the fingers 69 are bent over and into the space between the end walls 68 of the holding member. The locking fingers 69 are of a width to closely fit between and engage the end walls 68 and the upset end 71 of the rivet. If found desirable, the section 4, spring 11, and holding element may be secured together in a different overlapping relation. For example, the spring 11 could be located between the section 4 and the element. Also, if found desirable, the unit may be secured to the housing prior to the coupling, in which event the opening 33 in the carriage would be presented to receive the inner end of the spring 11. The offset portion 64 of the arm section 4 is preferably offset to an extent whereby the spring 11 and section are arranged in co-axial relation in order to permit the section 4 to engage the top wall of the housing to present an uninterrupted continuation of the housing. The said top wall is preferably curved in cross-section, as illustrated in Figure 10, and provides clearance for the head 70 of the rivet and so that the upper arris portions of the section 4 more or less engage the bottom wall or junction between the bottom and side walls of the channel 59. The leaf spring 11 is preferably slightly undulated and acts to normally urge the arm structure toward the windshield. Attention is directed to the fact that the resilient means 10 provides the only force necessary to retain teeth 32 and 37 in engagement and the only force necessary to maintain the coupling means in locked engagement with the shaft. This fact is important because if the spring 11 were relied upon for such maintenance and should for any reason become distorted and fail to perform its intended function of exerting pressure toward the windshield, the arm would be free to become disconnected from the shaft.

The sections constituting the arm structure and the elongated leaf spring 11 may be assembled together in a mode different from that illustrated in Figures 9 and 10. The modification depicted in Figures 11 and 12 is of such a character that a rivet such as the rivet 66 is not required to secure the parts, above referred to, in assembly. As shown, the outer end of the spring 11 and the inner offset planar portion of the arm section 4 are provided with substantially corresponding extruded circular portions 72 and 73, respectively, which respectively result in the formation of depressions or recesses 74 and 75 adjacent the upper surfaces of said parts. The extruded portion 72 of the spring seats in the depression 75, the extruded portion 73 in the aperture 76 of the holding element, and the corresponding fingers on the housing are bent over and received between the end walls of the element. These parts are thus firmly interlocked with respect to each other. It will be noted in the modified arrangement that the spring 11, arm section 4, and the holding member are assembled in the housing in the order named, whereas in the preferred construction exemplified in Figures 9 and 10, the spring 11, arm section 4, and the holding member 65 constitute a sub-assembly or unit which is secured as such with respect to the channel extremity 59 of the housing section before or after the coupling is mounted in place.

In view of the foregoing description, it will be manifest that the complete arm structure is adapted for quick detachable connection to shaft 2 by merely grasping the arm with one hand and directing it so that the beveled face portions 53 and 54 of the shaft will first be engaged by the re-entrant projection 27 of the carriage and the marginal edge 41 of the aperture 39 of the pawl. Further movement of the arm generally axially toward the shaft will cause the projection 27 to ride over the flat portion 42 and engage the abutment or shoulder 56 on the shaft, whereupon the projection will snap into one of the notches or seats 28 between the abutments 56 and 57 to lock the coupling means to the shaft, the parts thereupon assuming the positions as illustrated in Figure 4. When thus connected, the marginal side edges 40 and 41 and curved end margins 44 defining the aperture 39 in the pawl will be caused to more or less engage the flats 42 and 43 and circular portions 45 of the shaft, respectively. The inner parallel marginal edges 46 of the collar and the marginal edges 25 defining the opening 24 in the carriage will also be directed to engage the said circular portions of the shaft to assist in effecting a stabilized connection which substantially avoids thrust and prevents vibration between the various parts.

To adjust the arm while locked to the shaft, it is merely necessary to grasp the arm with one hand and apply sufficient force or pressure in the proper direction to cam and shift the carriage with respect to the pawl to disengage the teeth, whereupon the arm may be easily rotated in a plane generally parallel to the pawl to substantially any desired position within the prescribed range of 20 degrees to locate the arm in the proper rotative radial position with respect to the shaft and to a certain portion of the frame of the windshield, as depicted in Figures 1, 4, 5, and 6. Removal of the pressure will cause the spring 10 which has been placed under tension, to automatically shift the carriage back to its original position so that the teeth will again become engaged to lock the parts together. In this connection, it should be noted that various parts of the coupling means at once assume, under the influence of spring 10, their normal locked position with relation to each other, and the coupling is normally secured to the shaft. The spring 11 performs its function which is to urge the arm and wiper toward the windshield. Spring 11 does not oppose, impair, or influence significantly the effect of the resilient means 10 with respect to holding the teeth 32 and 37 in engagement and in locking the coupling to the shaft. The fact that the coupling may be readily secured to or removed from the shaft in the manner described and in any rotative position within the range referred to, is important from the standpoint of facilitating rapid assembly at low cost, on the production line and in service replacements. More specifically, the recess or clearance space on either side of the projection 27 allows the carriage, after being connected to the shaft, to be rotated for adjustment, the range or extent of rotation preferably being equal to or greater than that permitted between the carriage and pawl.

The arrangement is such that pressure may be applied at substantially any point along the top wall of the housing or at any frontal point along the housing 3 or outer arm section 4 to effect a camming between the carriage and pawl to disengage the teeth or to unlock the coupling from the shaft. More specifically, pressure may be applied substantially in an angular direction with respect to the shaft, as indicated by the arrow above the housing in Figure 5, or by first pressing the arm toward the shaft in a substantially axial direction and then altering the pressure by forcing the arm in a generally transverse direction toward the shaft. In other words, a minimum amount of pressure in a general axial direction will allow the arm to be easily rotated for adjustment and additional pressure will effect a release of the projection 27 from the seat 28 whereupon the arm may be disconnected from the shaft, in which process the pawl 8 and the carriage 7 move lengthwise with respect to each other and assume substantially the positions shown in Figure 5.

Accordingly, it will be apparent that the improved coupling means provides for a quick detachable snap connection which is positive and efficient in action and result.

It will also be manifest that the coupling means is of such a character that it may be connected and disconnected with respect to the shaft irrespective of its association with a wiper arm. In other words, the coupling may be operatively related to a variety of structures.

Furthermore, it will be apparent that improved means have been provided whereby the arm may be rotated and adjusted to a desired position while the coupling remains fastened to the shaft.

Moreover, it will be evident that improved means have been provided whereby to assemble the sections of the arm and spring 11 together.

Having thus described my invention, it is to be distinctly understood that although preferred embodiments or modifications of the invention have been illustrated and described, the invention is susceptible to other arrangements within the scope of the claims whereby to attain the objects set forth at the beginning of this specification.

I claim:

1. Means connectable to driving means for supporting windshield cleaner arm means, said connectable means including a part adapted to engage the driving means for movement therewith and a member movably mounted with respect to said part and provided with cooperating means, and said part being provided with means engageable with said cooperating means whereby to selectively predetermine the relative rotative position of said member with respect to said part when such part is in driving connection with the driving means.

2. Connecting means for attaching cleaner supporting means to driving means including, driven means adapted for driving connection with the driving means, clutch means rotatable with respect to the driven means and adapted for connection with the driving means for holding the connecting means substantially against axial movement along the shaft, and means whereby the clutch means may be locked selectively in any one of a plurality of rotative positions relative to the driven means.

3. Connecting means for attaching cleaner supporting means to driving means including, driven means adapted for driving connection with the the driving means, carriage means rotatable with respect to the driven means adapted for connection with the driving means for holding the connecting means substantially against axial movement and means whereby the driven means and carriage means may be locked together, said locking means being so constructed and arranged that the connecting means may be removed from the driving means when the carriage means is moved in a predetermined direction.

4. Means including at least two parts for connecting windshield cleaner arm means to driving means in a manner whereby one part of said connecting means may be rotated with respect to the other part and to said driving means in a plane substantially transverse to the longitudinal axis of said driving means when connected thereto, said parts being provided with means for determining the rotative position of one part with respect to the other, and means for forcibly urging the parts together.

5. Windshield wiper arm means provided with means for connecting the same to driving means provided with cooperating means, said connecting means including an element having a first portion adapted to engage the cooperating means, a second portion adapted to engage a part of the arm means in a manner whereby the arm means may be rotated in a plane generally transverse with respect to the longitudinal axis of the driving means to the position desired while the first portion is in engagement with the cooperating means and pressure means for urging the second portion into engagement with the part on said arm means.

6. Means for connecting an instrumentality to a driving means, said connecting means including a first member adapted for connection to the driving means for movement about the longitudinal axis of the latter, a second member operatively connected with said first member and adapted for connection and movement with the driving means and for cooperation with the first member in a manner whereby said first member may be held against movement about said axis and pressure means for urging the members together.

7. Arm means, latch means connected to said arm means and adapted to engage driving means, flexible means acting on said arm means and said latch means, and a member carried by the latch means adapted to engage the driving means in a manner whereby the flexible means will urge the latch means and member together so that the latch means may be interlocked with the driving means.

8. A shaft provided with a shoulder, latch means receiving said shaft, means operatively related to the shaft and the latch means, an arm connected to said latch means, flexible means operatively connected to the arm and acting on the latch means for pressing the latch means against the operatively related means to cause the latch means to engage the shoulder and hold the latch means connected to the shaft.

9. A shaft provided with a recess, latch means engaging said shaft, an arm pivotally connected to said latch means, a member carried by the latch means, and flexible means connected to said arm and acting on said latch means for pivoting the latch means and an arm in opposite directions whereby a portion of said latch means will be received and held in said recess by said member.

10. Shaft means, arm means provided with means for cleaning a surface, clamping means connecting the arm means to said shaft means, said arm means being provided with resilient means actable on said clamping means to normally press at least a portion of said clamping means against the shaft means to lock the arm means to the shaft means, the arrangement being such that the clamping means may be rendered temporarily inoperative by the application of sufficient pressure against the arm means to overcome at least some of the force normally exerted by said resilient means so that the arm means may be rotated and held in any desired rotative position while the said portion of the clamping means remains engaged with the shaft means.

11. Shaft means provided with an abutment means; an arm having a part rotatable about the shaft means engaging said abutment, a member carried by the part and supported on the shaft for rotation therewith, resilient means engaging the arm and part for normally urging the part into locking relationship with the member; and said shaft means, abutment arm, resilient means, part and member being so constructed and arranged that said part may be shifted and disengaged from said abutment and unlocked from the member by applying pressure to said arm in an angular direction toward the longitudinal axis of said shaft means.

12. A windshield wiper arm, means on the arm for connecting it to a driving means, said connecting means including a part adapted for non-rotative movement with respect to the driving means, and pressure means carried by the arm means cooperable with said part whereby said arm may be selectively adjusted to different rotative positions with respect to said driving means.

13. A shaft provided with abutment means, windshield wiper arm means provided with a part and latch means, said latch means having a first portion engaging the abutment means and a second portion latchable with said part in a manner whereby the arm means may be rotated with respect to the shaft to the position desired while the first portion of the latch means is held substantially in engagement with said shaft.

14. A shaft constructed to have means coupled to an end thereof for driving the same, said shaft being provided at said end with a pair of corresponding flat faces forming a pair of shoulders the planes of which are arranged substantially at right angles to said faces, a pair of notches intersecting said faces adjacent said shoulders, and said faces being chamfered.

15. Connection means comprising, a shaft provided with abutment means and a pawl adapted for movement therewith, a member rotatably receiving the shaft and provided with a projection and cooperating means, resilient means acting to hold the projection in engagement with the abutment means for holding the connection means connected to the shaft and the pawl in engagement with the cooperating means to prevent rotation of said member with respect to the shaft, an arm pivotally connected to said member, and flexible means connected to said arm and to said member for urging the arm in a predetermined direction, the arrangement being such that when sufficient pressure is applied to the arm the pawl and cooperating means will become disengaged whereby to permit the member to be rotated with respect to the pawl and then locked by removal of the pressure, and wherein pressure in excess of that required to permit rotation of the member will effect a disengagement between the projection and the shaft whereupon the connection means may be detached from the shaft.

16. A windshield wiper arm, a carriage pivotally connected to the arm, an opening provided in the carriage for rotatively receiving a drive shaft having an abutment, a projection provided on the carriage adapted to engage the abutment for holding the carriage on the shaft, a locking element mounted on the carriage adapted for non-rotative connection with the shaft, means on the locking element and carriage cooperable in a manner whereby the carriage may be located and locked in a rotative position desired with respect to the element when the element is in engagement with the shaft, and means on the arm operatively connected to the carriage for normally holding the carriage locked with said element and urging the arm toward a windshield.

17. A windshield wiper arm having an inner housing section, a first clutch member disposed in the section, a second clutch member arranged in the section and having a portion for connection with a drive shaft for movement therewith, and means for forcibly urging the clutch members together and for securing the arm to the shaft, the arrangement being such that when the said portion of the second clutch member is connected to a shaft, the first clutch member, said section and arm as a unit may be pivoted about the axis of the shaft and locked with respect to said second clutch member.

18. A windshield wiper arm having an inner housing section, a first clutch member disposed in the section and having an opening for receiving a drive shaft provided with cooperating means, a second clutch member arranged in the section and having an aperture aligned with the opening and formed to receive and connect with the cooperating means on the shaft so that the clutch member may be causer to rotate therewith, said clutch members having teeth concentrically arranged with respect to the opening and aperture, and means whereby the clutch members may be forcibly urged to interlock the teeth and connect the arm to a shaft and when connected the arm can be pivoted about the axis of the shaft to locate the arm in any rotative position permitted by the teeth.

JOHN W. ANDERSON.

REFERENCES CITED

The following references are of record in the file of this patent:

UNITED STATES PATENTS

| Number | Name | Date |
| --- | --- | --- |
| 1,991 | Withers | Aug. 24, 1813 |
| 249,909 | Donahue | Nov. 22, 1881 |
| 431,791 | Aldrich | July 8, 1890 |
| 712,061 | Hanna | Oct. 28, 1902 |
| 1,218,505 | Anderson | Mar. 6, 1917 |
| 1,428,596 | Kruger | Sept. 12, 1922 |
| 1,906,915 | Massey et al. | May 2, 1933 |
| 2,193,724 | Horton | Mar. 12, 1940 |
| 2,326,402 | Smulski | Aug. 10, 1943 |
| 2,357,280 | Smulski | Aug. 29, 1944 |
| 2,365,251 | Curtiss | Dec. 19, 1944 |
| 2,376,714 | Mussen | May 22, 1945 |
| 2,388,089 | Scinta | Oct. 30, 1945 |